(12) United States Patent
Maxfield et al.

(10) Patent No.: US 11,878,756 B2
(45) Date of Patent: Jan. 23, 2024

(54) APPARATUS FOR RETAINING A BICYCLE

(71) Applicant: TILT INDUSTRIES LLC, Orem, UT (US)

(72) Inventors: Bradley Scott Maxfield, Orem, UT (US); Mitchel Richard Murdock, Orem, UT (US); Travis James Mittanck, Orem, UT (US); Grant Reuben Fawson, Orem, UT (US)

(73) Assignee: TILT INDUSTRIES LLC, Orem, UT (US)

( * ) Notice: Subject to any disclaimer, the term of this patent is extended or adjusted under 35 U.S.C. 154(b) by 296 days.

(21) Appl. No.: 16/843,814

(22) Filed: Apr. 8, 2020

(65) Prior Publication Data

US 2020/0324840 A1    Oct. 15, 2020

Related U.S. Application Data

(60) Provisional application No. 62/831,827, filed on Apr. 10, 2019.

(51) Int. Cl.
*B62H 7/00*   (2006.01)
*B62H 3/06*   (2006.01)
*B62H 3/08*   (2006.01)
*A63B 69/16*  (2006.01)

(52) U.S. Cl.
CPC .............. *B62H 7/00* (2013.01); *A63B 69/16* (2013.01); *B62H 3/06* (2013.01); *B62H 3/08* (2013.01); *A63B 2069/163* (2013.01); *A63B 2069/164* (2013.01); *A63B 2210/50* (2013.01)

(58) Field of Classification Search
CPC .... B62H 3/08; B62H 7/00; A47F 7/00; B60R 9/10
See application file for complete search history.

(56) References Cited

U.S. PATENT DOCUMENTS

2007/0164065 A1\*   7/2007   Davis ..................... B60R 9/048
                                                       224/324
2008/0164292 A1\*   7/2008   Farney ..................... B60R 9/10
                                                       224/324

(Continued)

FOREIGN PATENT DOCUMENTS

CN         208559607 U      3/2019
KR       1020110091241 A    8/2011

(Continued)

OTHER PUBLICATIONS

Search Report under Section 17 dated Sep. 11, 2020; United Kingdom Patent Application No. GB2005271.8; 5 pages.

(Continued)

*Primary Examiner* — Eugene L Kim
*Assistant Examiner* — Christopher Glenn
(74) *Attorney, Agent, or Firm* — HOLLAND & HART LLP

(57) ABSTRACT

A bike balance trainer apparatus for training a rider to balance on a single wheel of a bicycle and including a mount for a service stand and an attachment to allow it to act as a bike stand or storage apparatus is provided. The apparatus may have a base support member and a tire retention member movably connected to the base support member about a first pivot.

18 Claims, 8 Drawing Sheets

(56) References Cited

U.S. PATENT DOCUMENTS

| | | | |
|---|---|---|---|
| 2011/0220594 A1* | 9/2011 | Chuang | B62H 3/00 |
| | | | 211/22 |
| 2013/0092645 A1* | 4/2013 | Kedar | B62H 3/04 |
| | | | 211/20 |
| 2014/0284288 A1* | 9/2014 | Huntington | B62H 3/04 |
| | | | 211/20 |
| 2015/0329059 A1* | 11/2015 | Jobe | B60R 9/10 |
| | | | 224/403 |

FOREIGN PATENT DOCUMENTS

| | | |
|---|---|---|
| KR | 1020140092043 A | 7/2014 |
| KR | 101466948 B1 | 12/2014 |
| TW | 381560 U | 2/2000 |

OTHER PUBLICATIONS

"Introducing The Manual Machine" by Ninja Skills Guru, Jul. 5, 2017, accessed Sep. 11, 2020, https://sandiegomountainbikeskills.com/20 I 7 /07 /0 5 /introducing-themanual-machine/.
Intention to Grant dated Dec. 16, 2022; United Kingdom Patent Application No. GB2005271.8; 2 pages.

* cited by examiner

APPARATUS FOR RETAINING A BICYCLE

BACKGROUND

Mountain biking and other forms of cycling often include maneuvering around or over obstacles and uneven terrain. Many cyclists find it helpful to lift the front (and occasionally the rear) wheel of their bicycle over the obstacles on their trail. Doing this also looks cool and shows off the rider's ability and skill. Such a maneuver requires a very specific ability to balance on a single wheel of the bicycle while riding. Failure to keep balance may result in hitting the obstacle or crashing, potentially causing injury to the cyclist or damage to the bicycle. Some cyclists attempt to improve their ability to balance through performing core exercises that strengthen the muscles involved with balancing. There is a need to provide new ways to train cyclists in this balance skill in a safe and controlled manner.

In addition, bike repair and storage often require bulky and expensive equipment that occupy valuable space. Service stands are helpful during bicycle maintenance, while bike stands and/or other storage options to keep a bike up and off of the ground and/or out of the way are valued by cyclists. It would be beneficial to provide a device capable of serving multiple functions such as acting as a balance trainer, while being able to also support a service stand or act as a bike storage device. Such a device is provided in this disclosure.

SUMMARY

An apparatus is provided for retaining a bicycle in place to support a cyclist in a balanced position to help train the rider to balance in that position. In one embodiment, the apparatus may include a base support member, a secondary support member connected to the base support member, the secondary support member having a first side that is oriented to face the base support member, and an elongated slot formed on the first side of the secondary support member. In some embodiments the elongated slot includes first and second side walls and a slot. The slot may have a specified depth. At least one of the first and second side walls is configured to retain a tire inserted at least partially into the slot. In some embodiments of the apparatus, the base support member is pivotably connected to the secondary support member about a first pivot.

The apparatus may include a fastening mechanism attached near a point at which the secondary support member connects to the base support member. In some embodiments in which the base support member is pivotably connected to the secondary member, this fastening mechanism may be attached near the first pivot. The fastening mechanism may be adapted and/or sized to fasten a tire to one or more of the base support member and the secondary support member.

The apparatus may include at least one lateral support member pivotably connected to the base support member about a second pivot. The second pivot may be transversely oriented with respect to the first pivot.

The apparatus may include at least one additional lateral support member pivotably connected to the base support member about a third pivot. The third pivot may be transversely oriented with respect to the first pivot and aligned with the second pivot.

At least one lateral support member may include a first leg proximate a first end of the base support member and a second leg proximate a second end of the base support member.

At least one lateral support member may be movable into an expanded position where the lateral support member is oriented so that the first and second legs are aligned with a width of the base support member. At least one lateral support member may be movable into a collapsed position where the lateral support member is oriented so that the first and second legs are at least substantially transverse the width and the length of the base support member.

The secondary support member may be movable into an expanded position where the secondary support member is transversely oriented to a length of the base support member. The secondary support member may be movable into a collapsed position where the secondary support member is aligned with the length of the base support member.

In embodiments of the apparatus in which the base support member is pivotably connected to the secondary support member, about a first pivot, the apparatus may include an anti-over rotation linkage strap connected to an end of the base support member opposite of the first pivot connection between the base support member and the secondary support member.

The base support member may include a base slot. The base slot may include a first base side wall and a second base side wall facing the first side wall. At least one of the first base side wall and the second base side wall may be tapered with respect to the other causing the space. In some cases, the base slot is configured to retain at least a portion of a tire.

The apparatus may include a service stand connector incorporated into the secondary support member. A service stand may be insertable into the service stand connector when the secondary support member is oriented into a vertical orientation in an expanded position to hold the service stand in the vertical orientation. Thus, the apparatus of the invention may include a service stand.

In embodiments of the apparatus in which the base support member is pivotably connected to the secondary support member, about a first pivot, the apparatus may include a rotation limiting mechanism incorporated into a pivot between the base support member and the secondary pivot member limiting a freedom of rotation between the base support member and the secondary support member to under about 100 degrees. In some cases, the rotation limiting mechanism is a locking mechanism that holds the secondary support member in a fixed position.

The apparatus may include a wall suspension mechanism that connects at least a portion of the apparatus to a vertical surface so that the base support mechanism is oriented against the vertical surface and the secondary support mechanism is transversely oriented with respect to the vertical surface when the secondary support mechanism is in an expanded position.

In some embodiments, a balance apparatus may include a base support member, a secondary support member pivotably connected to the base support member about a first pivot, a first side of the secondary support member that is oriented to face the base support member, and a tire retaining mechanism incorporated into the first side. The tire retaining mechanism may include a receptacle configured to retain a tire inserted at least partially into the slot and a fastening mechanism attached proximate a pivot between the based support member and the secondary support member.

The apparatus may include a first lateral support member pivotably connected to a first side of the base support member about a second pivot and a second lateral support member pivotably connected to a second side of the base support member about a third. At least one of the first lateral support member and the second lateral support member may include multiple legs extending away from the second pivot or the third pivot respectively.

The apparatus may be movable into an expanded position where the first lateral support member and the second lateral support member are oriented so that the multiple legs extend radially and/or at an angle from the base support member. The secondary support member may be transversely oriented with respect to a length of the base support member when in the expanded position.

The apparatus may be movable into a collapsed position where the first lateral support member and the second lateral support member are oriented so that the multiple legs are folded against the base support member, in some cases becoming transversely oriented with respect to a width of the base support member. The secondary support member may be aligned with respect to a length of the base support member when in the collapsed position, and the secondary support member may be transversely oriented with respect to the base support member when the apparatus is in the expanded position.

In embodiments of the apparatus in which the base support member is pivotably connected to the secondary support member, about a first pivot, the apparatus may include an anti-rotation linkage connected to an end of the base support member opposite of the first pivot connection between the base support member and the secondary support member.

The base support member may include a base slot. The base slot may include a first base side wall and a second base side wall facing the first side wall. The base slot may be configured to retain at least a portion of the tire. In some examples, at least one of the first base side wall and the second base side wall may be angled with respect to the other forming a V-shape space into which the tire can be inserted.

In some embodiments, a balance apparatus includes a base support member. The base support member may include a first base side wall and a second base side wall facing the first side wall. The base slot may be configured to retain at least a portion of the tire. In some cases, at least one of the first base side wall and the second base side wall of the base slot is angled with respect to the other. The apparatus may also include a secondary support member pivotably connected to the base support member about a first pivot, a service stand connector attached to the secondary support member and/or the base support member, and a tire retaining mechanism incorporated into the first side. The tire retaining mechanism may include a receptacle configured to retain a tire inserted at least partially into the slot and a fastening mechanism attached proximate a pivot between the base support member and the secondary support member. A service stand may be inserted into the service stand connector when the secondary support member is oriented into a vertical orientation in an expanded position to hold the service stand in a vertical orientation. Thus, the apparatus of the present disclosure may include a service stand for use as described herein.

In one embodiment, an apparatus includes a base support member, a tire retention member connected to the base support member, and a service stand connector. In some such embodiments, the tire retention member may be pivotably attached to the base support member.

The service stand connector may be incorporated into the tire retention member.

The tire retention member may be configured to retain a portion of a tire through a compressive force.

The tire retention member may include an elongated slot formed on the first side of the tire retention member, the elongated slot including first and second side walls and a slot depth where at least one of the first and second side walls is configured to retain a tire inserted at least partially into the elongated slot.

The apparatus may include a fastening mechanism sized to fasten the tire to both the base support member and the tire retention member.

The apparatus may include at least one lateral support member movably connected to the base support member where the at least one lateral support member is movable to be transversely oriented with respect to the first pivot.

The apparatus may include at least one additional lateral support member movably connected to the base support member where the at least one additional lateral support member is movable to be transversely oriented with respect to the first pivot.

The at least one lateral support member may be movable into an expanded position where the lateral support member is oriented so that the first and second leg are aligned with a width of the base support member, and the at least one lateral support member is movable into a collapsed position where the lateral support member is oriented so that the first and second leg are transverse the width of the base support member.

The tire retention member may be movable into an expanded position where the tire retention member is transversely oriented to a length of the base support member, and the tire retention member is movable into a collapsed position where the tire retention member is aligned with the length of the base support member.

In embodiments of the apparatus in which the base support member is pivotably connected to the secondary support member, about a first pivot, the apparatus may include an anti-over rotation linkage connected to an end of the base support member opposite of the first pivot.

The base support member may include a base slot where the base slot includes a first base side wall, a second base side wall facing the first side wall. and where at least one of the first base side wall and the second base side wall is tapered with respect to the other and configured to retain at least a portion of a tire in the base slot.

A service stand may be insertable into the service stand connector when the tire retention member is oriented into a vertical orientation in an expanded position to hold the service stand in the vertical orientation. The apparatus may thus include a service stand to operate as described herein in supporting a bicycle during use of the apparatus to allow storage or service of a bicycle.

The apparatus may include a locking mechanism incorporated into the first pivot between the base support member and the tire retention member limiting a freedom of rotation between the base support member and the tire retention member.

The apparatus may include a wall suspension mechanism that connects at least a portion of the apparatus to a vertical surface so that the base support mechanism is oriented against the vertical surface and the tire retention mechanism is transversely oriented with respect to the vertical surface when the tire retention mechanism is in an expanded position.

In some examples, a balance apparatus may include a base support member, a tire retention member connected to the base support member, a first side of the tire retention member that is oriented to face the base support member, and a tire retaining mechanism incorporated into the first side. In some configurations, the base support member may be pivotably connected to the tire retention member. In some such, the base support member is connected to the tire retention member about a first pivot. The tire retaining mechanism may include a receptacle configured to retain a tire inserted at least partially into the slot.

The apparatus may include a first lateral support member movably connected to a first side of the base support member, and a second lateral support member movably connected to a second side of the base support member.

The apparatus may be movable into an expanded position where the first lateral support member and the second lateral support member are oriented to be aligned with a width of the base support member, and the tire retention member may be transversely oriented with respect to a length of the base support member in the expanded position.

The apparatus may be movable into a collapsed position where the first lateral support member and the second lateral support member are oriented to be transverse with respect to a width of the base support member, and the tire retention member may be aligned with respect to a length of the base support member in the collapsed position.

The apparatus may include an anti-over rotation linkage connected to an end of the base support member opposite of the first pivot connection between the base support member and the tire retention member.

In some embodiments, a balance apparatus may include a base support member where the base support member includes a first base side wall, and a second base side wall facing the first side wall where at least one of the first base side wall and the second base side wall is angled with respect to the other and configured to retain at least a portion of the tire in the base slot. The apparatus may include a tire retention member movably connected to the base support member about a first pivot, a service stand connector incorporated into tire retention member, a tire retaining mechanism incorporated into the first side. The tire retaining mechanism may include a receptacle configured to retain a tire inserted at least partially into the slot, and a fastening mechanism attached proximate a pivot connection between the based support member and the tire retention member. A service stand may be insertable into the service stand connector when the tire retention member is oriented into a vertical orientation in an expanded position to hold the service stand in the vertical orientation.

BRIEF DESCRIPTION OF THE DRAWINGS

The accompanying drawings illustrate various embodiments of the present apparatus and are a part of the specification. The illustrated embodiments are merely examples of the present apparatus and do not limit the scope thereof.

Throughout the drawings, identical reference numbers designate similar, but not necessarily identical, elements.

DETAILED DESCRIPTION

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. Often, the width of an object is transverse to the object's length. For purposes of this disclosure, the term "service stand" generally refers to a device to which bicycles may be securely attached while not in use and/or a device which secures a bicycle during maintenance or repair, in some instances holding it off of the ground to facilitate such maintenance or repair. In some cases, the service stand may be configured to support the entire weight or a portion of the weight of the bicycle by holding the bicycle, at least partially or entirely, off of the ground, either during storage and/or during maintenance/repair.

Figure 1:
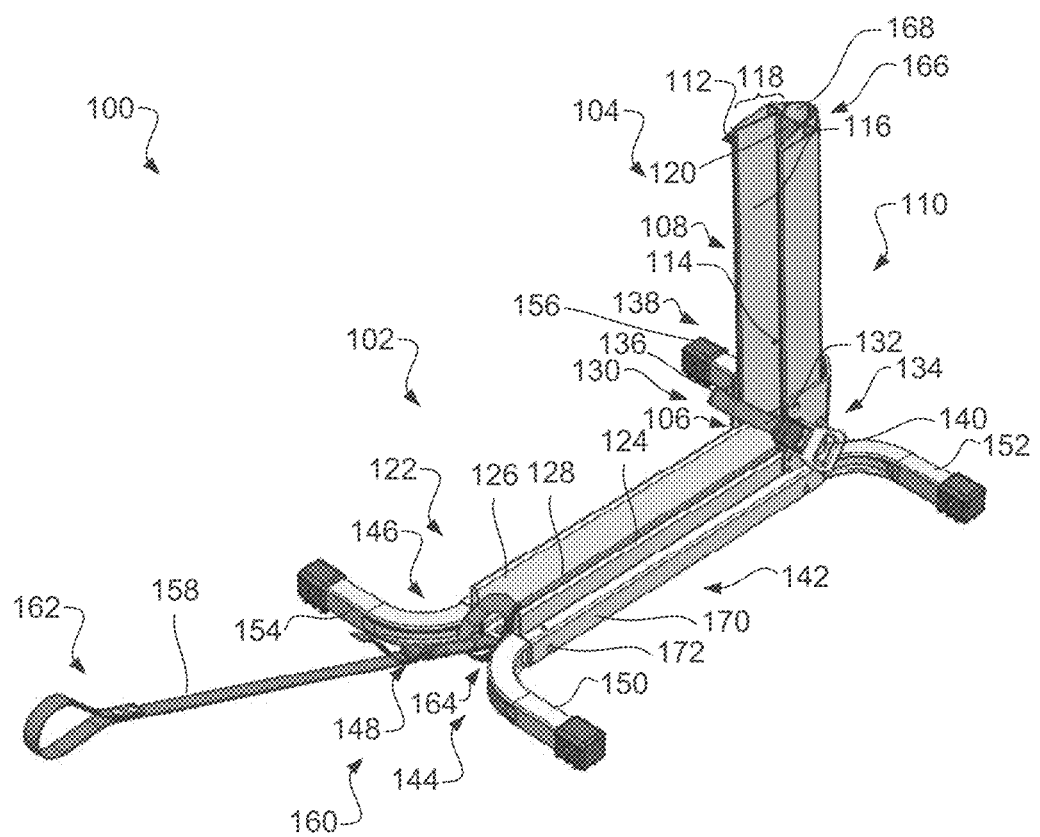
FIG. 1 is a perspective view of an example of an apparatus in an expanded position in accordance with the present disclosure.

With reference to the figures, FIG. 1 depicts an example of an apparatus 100. In some examples, the apparatus 100 is used to retain a bicycle tire in a stationary position while a user tries to balance on the bicycle with the retained tire secured in the apparatus 100 and the other tire lifted off of the ground. In some instances, a rear tire is secured in the apparatus 100, while in others, a front tire may be secured in the apparatus 100.

The apparatus 100 includes a base support member 102 and a secondary support 104 member pivotably connected to the base support member 102 about a first pivot 106. In some configurations, such as that shown in FIG. 1, the base support member 102 and secondary support member 104 are connected pivotably. In others, the base support member 102 and secondary support member 104 may be configured to be interconnected without pivoting. In some such methods, the base support member 102 and secondary support member 104 may be permanently interconnected. In others, the base support member 102 and secondary support member 104 may be releasably interconnected. The ability to interconnect the base support member 102 and secondary support member 104 may provide benefits in shipping or storing them in a non-connected configuration, allowing them to be assembled on delivery, or for use. In some configurations, releasably interconnecting the base support member 102 and secondary support member 104 allows them to be separated for storage or transport.

In some examples, the secondary support member is a tire retention member. In the illustrated example, the secondary support member 104 has a first secondary side 108 that is oriented to face the base support member 102 and a far secondary side 110 that is opposite first secondary side 108.

An elongated slot 112 may be formed and/or defined in the first secondary side 108 of the secondary support member 104. The elongated slot 112 may have a first side wall 114, a second side wall 116, and a slot depth 118. In this example, the elongated slot includes a back surface 120 that attaches to the first side wall 114 and the second side wall 116. At least one of the first and second side walls 114, 116 may be configured to retain a tire inserted at least partially into the elongated slot 112.

In the example depicted in FIG. 1, the elongated slot 112 is configured to retain tires having a wide range of tire widths. In this example, both the first side wall 114 and the second side wall 116 taper inwardly from the first secondary side 108 to the far secondary side 110 thereby progressively narrowing the space between the first and second side walls 114, 116. As a tire is inserted into the elongated slot 112, the tire may move deeper into the elongated slot's depth until the tire is firmly secured against the tapering first and second side walls 114, 116. The tapering first and second side walls 114, 116 may impose a lateral compressive force on the portion of the tire inserted into the elongated slot 112.

FIG. 1 also depicts that the base support member 102 includes a base slot 122. The base slot 122 may include a first base side wall 124 and a second base side wall 126 facing the first side wall 124. In the example of FIG. 1, the base slot 122 includes a base back surface 128 that connects to the first and second base side walls 124, 126. Further, in this example, at least one of the first base side wall 124 and the second base side wall 126 is tapered with respect to the other causing the space between the first base side wall 124 and the second base side wall 126 to progressively narrow towards the back surface 128 of the base slot 122.

A fastening mechanism 130 is attached proximate the first pivot 106. The fastening mechanism 130 may be sized to fasten the tire to one or both of the base support member 102 and the secondary support member 104. In some examples, the fastening mechanism is a strap. In examples where the fastening mechanism is a strap, the strap may include a first portion 132 attached to a first side 134 of the apparatus 100 and a second portion 136 connected to second side 138 of the apparatus 100. At least one of the first and second portions 132, 136 of the strap may be configured to move over an inside surface of the tire and connect to the other portion of the strap. The strap portions 132, 136 may be secured to each other through a strap buckle 140.

In the example of FIG. 1 a first lateral support member 142 is pivotably connected to the base support member 102 on a first side 134 of the apparatus 100 about a second pivot 144. In this example, the second pivot 144 is transversely oriented with respect to the first pivot 106. The apparatus 100 also includes a second lateral support member 146 on a second side 138 of the apparatus and is pivotably connected to the base support member 102 about a third pivot 148. The third pivot 148 is transversely oriented with respect to the first pivot 106 and aligned with the second pivot 144.

In some examples, at least one of the first pivot, second pivot, and third pivot are hinge-type mechanisms. In other examples, at least one of the first pivot, second pivot, and third pivot have an axle about which the secondary support member or lateral support members respectively can rotate. In yet another example, at least one of the first pivot, second pivot, and third pivot include inserting a portion of the secondary support member and/or lateral support member into a retention slot such that the secondary support member and/or the lateral support member is oriented into either an expanded position or into the collapsed position.

In the example of FIG. 1, each of the first and second lateral support members 142, 146 includes a first leg 150 proximate a first end 152 of the base support member 102 and a second leg 154 proximate a second end 156 of the base support member 102. In some examples, the first and second lateral support members 142, 146 form a U-shape. In other examples, the first and second lateral support members 142, 146 may have any appropriate shape. The first and second lateral support members 142, 146 may provide lateral support to the apparatus 100 to prevent the apparatus 100 from tilting from the load associated with a user trying to balance on a bicycle. In some situations, such as when the apparatus 100 is in an expanded position, a locking mechanism may prevent at least one of the first and second lateral support members 142, 146 from rotating about the second or third pivot 144, 148 respectively.

In some examples, an end of at least one of first and second lateral support members 142, 146 can be inserted into a receptacle 170 incorporated into the apparatus 100. The shape of the end of the lateral support member 142, 146 and the shape of the receptacle 170 may inherently prevent rotation. For example, the shapes may be square shapes, rectangular shapes, triangular shapes, polygonal shapes, irregular shapes, asymmetric shapes, other types of shapes, or combinations thereof. In some examples, a locking mechanism 172 may prevent the end of the lateral support member from sliding out of the receptacle. The locking member may include a spring pin, crutch pin, another type of pin, or combinations thereof to keep lateral support member from sliding out of the receptacle. In some examples, the lateral support member 142, 146 may include a round shape and the receptacle may include a round shape. In this example, a pin or another type of locking mechanism 172 may prevent both rotation within the receptacle and the lateral movement of sliding out of the receptacle.

When the apparatus 100 is in an expanded position, the secondary support member 104 may be rotated about the first pivot 106 so that the secondary support member 104 is extended away from the base support member 102. In some cases, the secondary support member 104 is transversely oriented with respect to the base support member 102 when the apparatus 100 is in the expanded position. The secondary support member 104 may be oriented to extend into an upright position. The base support member 102 and the secondary support member 104 may be oriented so that the base slot 122 and the elongated slot 112 are arranged to collectively receive different portions of a tire simultaneously. Such an arrangement of the base support member 102 and the secondary support member 104 may allow a portion of the tire to be retained within the base slot 122 while another portion of the tire is retained in the elongated slot 112 of the secondary support member 104.

Further, in the expanded position, the first and second lateral support members 142, 146 may generally reside in the same plane extending outwardly from the base support member in generally opposite directions. In the expanded position of FIG. 1, the first and second lateral support members 142, 146 are transversely oriented with respect to the secondary support member 104. In other examples, the feet extend downwardly from the legs or extend at an angle from the legs to contact the ground.

The apparatus 100 may also contain an anti-over rotation linkage 158 connected to an end 160 of the base support member 102 opposite of the first pivot 106 between the base support member 102 and the secondary support member 104. In other examples, the anti-over rotation linkage 158 may be attached to another location on the apparatus. In some examples, the anti-over rotation linkage 158 includes a strap, a chain, a linkage, a rod, a rope, a cord, a brace, another type of linkage, another type of anti-over rotation linkage, or combinations thereof.

The anti-over rotation linkage 158 may include a bicycle end 162 that is configured to connect to a portion of the bicycle and an apparatus end 164 that is configured to connect to the end 160 of the base support member 102 or another portion of the apparatus 100. When a tire of a bicycle is retained in the apparatus 100 and a user is balancing on the bicycle and the anti-over rotation linkage 158 is connected to both a far side of the bicycle and the apparatus 100, the anti-over rotation linkage 158 may prevent the free end of the bicycle from rotating too far upwards. Thus, the anti-over rotation linkage 158 may be used to prevent the user from over rotating when trying to balance the bicycle.

Also, in the example of FIG. 1, a service stand connector 166 is connected to the far secondary side 110 of the secondary support member 104. In this example, the service stand connector 166 defines a channel 168 that can receive a portion of a rod incorporated into a service stand. With the apparatus 100 in the expanded position and a portion of the service stand attached to the service stand connector 166 of the secondary support member 104, the apparatus can be used to support a service stand that can support the weight of a bicycle.

While this example depicts the service stand connector 166 with a channel 168, any appropriate type of service stand connector may be used in accordance with the present disclosure. For example, a non-exhaustive list of components that may be part of the service stand connector includes latches, hooks, straps, magnets, slots, open slots, closed slots, compression fits, other types of features, or combinations thereof.

While this example has been described with specific mechanisms for retaining a portion of the tire in the elongated slot and/or the base slot, any appropriate mechanism may be used to secure the tire within the elongated slot, the base slot, or both. For example, at least one protrusion may be disposed on the inside portion of either the base slot or the elongated slot to retain the tire in place. In another example, a portion of the first and second side walls of either slot may be movable, biased, spring-loaded, or selectively retractable, thereby allowing at least a portion of either slot to move vertically or laterally to accommodate different tire sizes and/or widths. Such movable portions of the first and second side walls may be spring loaded or otherwise urged inward to engage the tire. Other mechanisms of applying a lateral compressive force to the tire may also be used within the scope of the invention. Additionally, while these alternative examples describe retaining the tire, at least in part, with a compressive lateral force on the tire, the secondary support member or the base support member may be configured to apply a vertical compressive force or longitudinal compressive force on the tire to retain the tire in place. In some cases, a vertical compressive force, a lateral compressive force, a longitudinal compressive force, or combinations thereof may be used, at least in part, to retain the tire in place. In yet other examples, either the base support member or the secondary support member may retain the tire in their respective slot, at least in part, through a tension mechanism. Such a tension mechanism may include a first attachment securing the tire to a first portion of the respective slot and a second attachment securing the tire to a second portion of the respective slot, where a force is applied to pull at least a portion of the tire between the first and second attachments. In yet another example, the components of the apparatus 100 used to retain the bicycle tire may be removable inserts that are inserted into the apparatus to retain the portion of the tire.

In some cases, the length of the elongated slot is the entire length of the secondary support member. Likewise, in some cases, the length of the base slot may be the entire length of the base support member. However, in some cases, the length of the elongated slot may be less than the entire length of the secondary support member, and the length of the base slot may be less than the entire length of the base support member.

In some examples, the first and second side walls of the base slot and/or secondary elongated slot are tapered. However, in alternative examples, at least one of the first and second side walls in either slot is straight forming a generally right angle with the back surfaces of their respective slot. In yet another alternative example, either the base slot and/or the secondary elongated slot is a through slot with no back surface. Further, the first and second side walls of either slot may taper inwardly and connect directly to each other without forming a back surface.

While this example has been described with reference to a specific type of fastening mechanism to at least assist to retain the tire within the elongated slot, the base slot, or both slots, any appropriate type of fastening mechanism may be used in accordance with the present disclosure. For example, a non-exhaustive list of fastening mechanisms may include straps, hooks, bungees, snaps, webbing, nets, magnets, anchors, other types of attachment mechanisms, or combinations thereof. Further, in additional examples, more than one fastening mechanism may be applied to assist, at least in part, to retain the tire within at least one of the slots. For example, a base fastening mechanism may be used to retain a first portion of the tire within the base slot of the base support member, and a secondary fastening mechanism may be used to retain a second portion of the tire in the elongated slot of the secondary support member.

Figure 2:
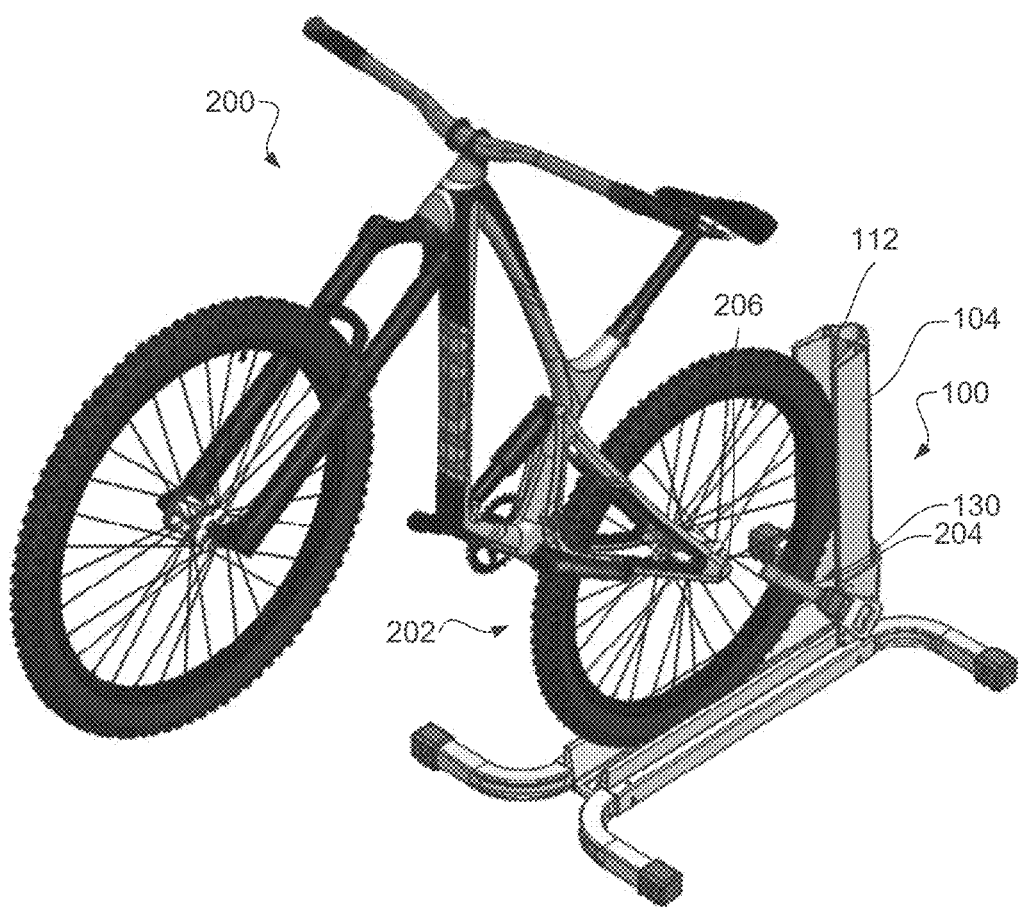
FIG. 2 is a perspective view of an example of an apparatus retaining a bicycle in accordance with the present disclosure.

FIG. 2 depicts an example of a bicycle 200 attached to the apparatus 100. In this example, a rear tire 202 of the bicycle 200 is retained in the base slot 122 and the elongated slot 112 of the secondary support member 104. The fastening mechanism 130 includes a strap 204 that is placed over a portion of the rear tire 202 and pulled in tight to firmly hold the rear tire 202 in place. The base slot 122 and the elongated slot 112 of the secondary support member 104 include tapered side walls that contribute, at least in part, to holding the rear tire 202 snugly in place. With the rear tire 202 snugly secured to the apparatus 100, the remainder of the bicycle 200 can rotate about the rear axle 206 of the bicycle 200. With the remainder of the bicycle 200 free to rotate upwards, a user can get on the bicycle 200 and lift the front portion of the bicycle 200 off the ground while balancing the bicycle on the retained tire.

Figure 3:
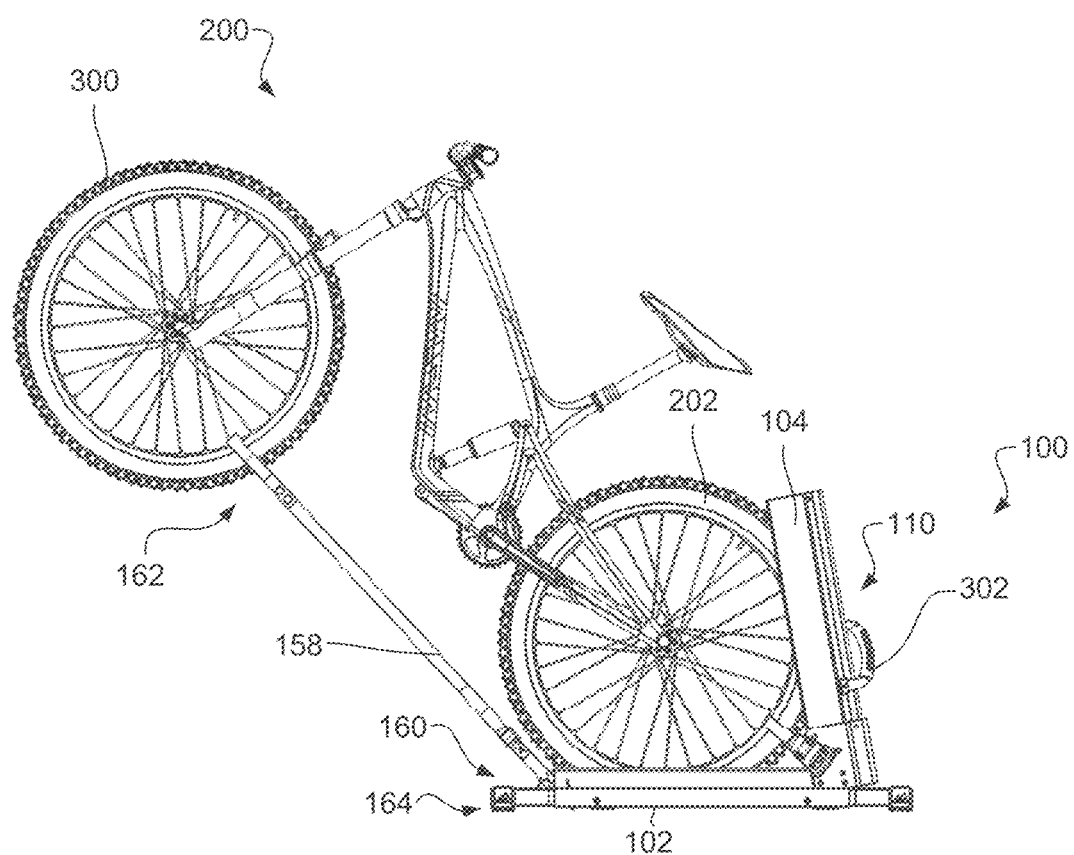
FIG. 3 is a side view of an example of an apparatus retaining a bicycle in accordance with the present disclosure.

FIG. 3 depicts an example of a bicycle 200 attached to the apparatus 100. In this example, an apparatus end 164 of the anti-over rotation linkage 158 is connected to an end 160 of the base support member 102 and a bicycle end 162 of the anti-over rotation linkage 158 is connected to a far side of the bicycle 200. In this example, the bicycle end 162 of the anti-over rotation linkage 158 is connected to the front wheel 300 of the bicycle 200. However, in alternative examples, the anti-over rotation linkage 158 may be connected to any appropriate portion of the bicycle 200. In the example of FIG. 3, a handle 302 is also depicted on the far secondary side 110 of the secondary support member 104.

In this example, the secondary support member 104 is oriented to form an angle with the base support member 102 that is less than a 90 degree angle. However, in alternative examples, the secondary support member 104 may be oriented to form a right angle with the base support member 102, an obtuse angle, another type of angle, or combinations thereof.

While this example depicts the rear wheel 202 of the bicycle 200 secured to the apparatus, in other examples the front wheel 300 may be secured to the apparatus 100. In this type of situation, the user may try to balance on the bicycle by lifting the rear wheel 202 off the ground with the front wheel 300 secured to the apparatus 100.

Figure 4:
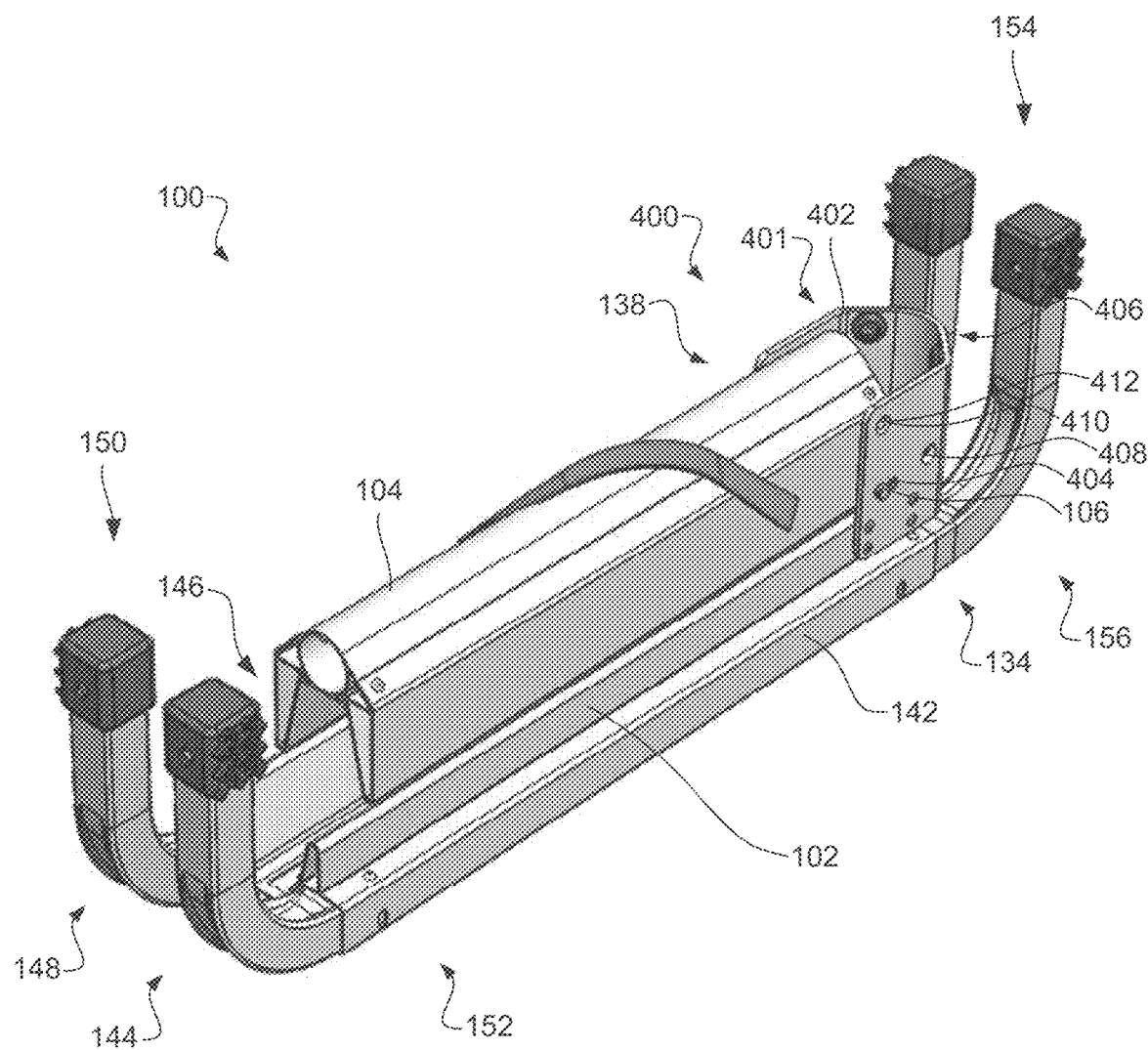
FIG. 4 is a perspective view of an example of an apparatus in a collapsed position in accordance with the present disclosure.

FIG. 4 depicts an example of the apparatus 100 in a collapsed position. In this collapsed position, the components of the apparatus 100 may be moved into a smaller configuration for storage or transportation. At least one lateral support member 142, 146 is movable into a collapsed position where the lateral support member 142, 146 is oriented so that the first and second leg 150, 154 are transversely oriented with respect to the width of the base support member 102.

Further, the secondary support member 104 may be movable into a collapsed position where the secondary support member 104 is aligned with the length of the base support member 102. The apparatus 100 may be movable into a collapsed position where the first lateral support member 142 and the second lateral support member 146 are oriented so that their legs 150, 154 are transversely oriented with respect to a width of the base support member 102 and the secondary support member 104 is aligned with respect to a length of the base support member 102 in the collapsed position.

In this example, the secondary support member 104 may pivot about the first pivot 106 so that the secondary support member 104 is brought into contact or nearly into contact with the base support member 102. The first and second lateral support members 142, 146 are rotated about the second and third pivots 144, 148 respectively so that the legs 150, 154 are aligned with each other. Further, the legs 150, 154 may span the collective height of the base support member 102 and the secondary support member 104 when the apparatus is in the collapsed position.

FIG. 4 also depicts a locking mechanism 400. In this example, a connector 402 includes a U-shape 401 and is connected to the base support member 102 on both a first side 134 and a second side 138 of the apparatus 100. The connector 402 includes a pivot support 404 for the first pivot 106. The back side 406 of the connector 402 may limit the secondary support members range of motion. An expanded locking slot 408 and a collapsed locking slot 410 may be formed in the connector 402. A pin 412 may be moved between the expanded locking slot 408 and a collapsed locking slot 410 when the secondary support member 104 is moved between the expanded position and the collapsed position. When the secondary support member 104 is moved to the appropriate location, the pin 412 may move into the respective slot 408, 410 thereby locking the secondary support member in the respective position. To change the secondary support member's position, the user may remove the pin 412 out of the respective slot 408, 410.

Figure 5:
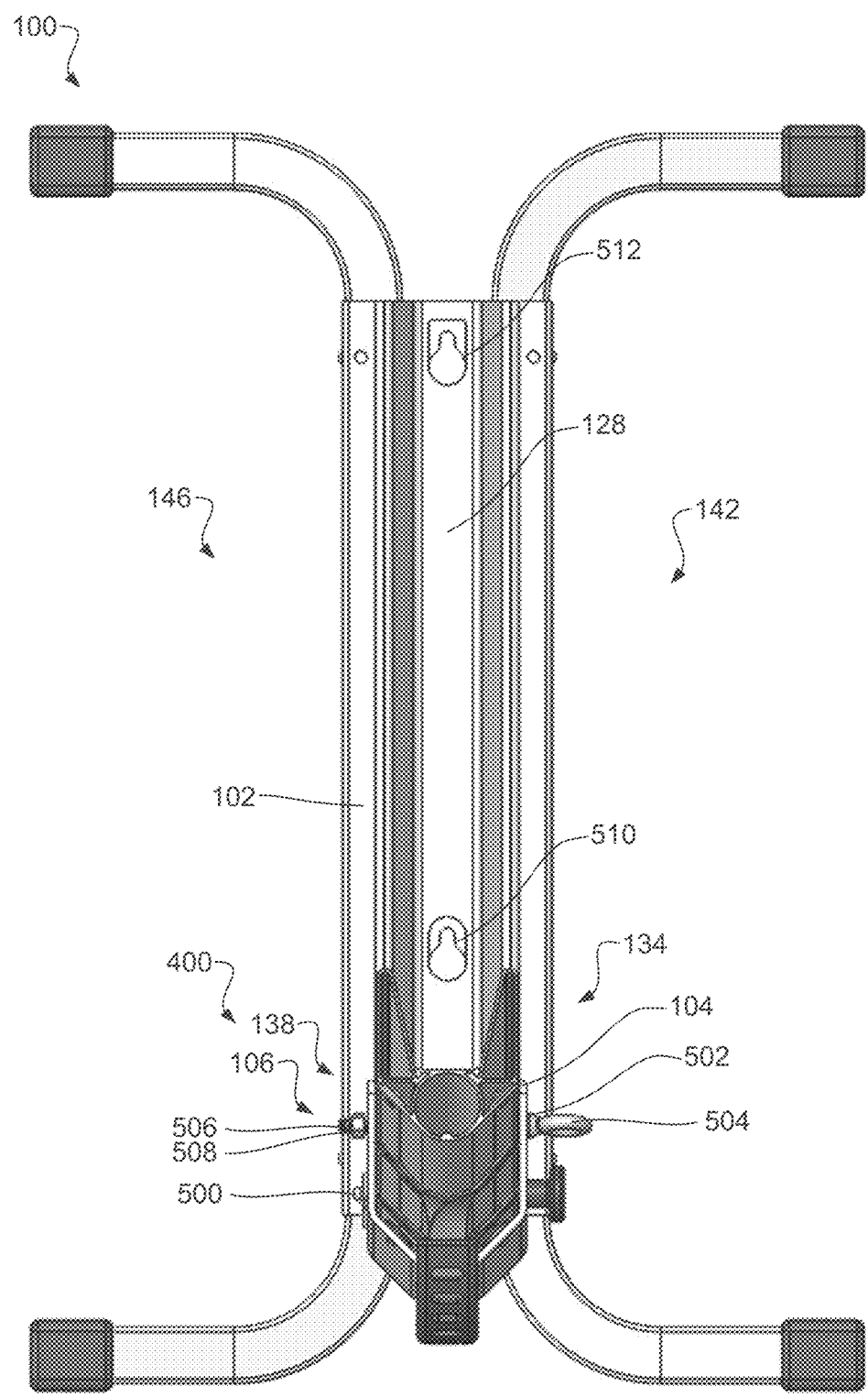
FIG. 5 is a top view of an example of an apparatus in an expanded position in accordance with the present disclosure.

FIG. 5 depicts an example of apparatus 100 from a top view. In this example, the apparatus 100 is in an expanded position where the first and second lateral support members 142, 146 are extending in substantially opposite directions and the secondary support member 104 is extended away from the base support member 102. FIG. 5 also depicts another example of the locking mechanism 400. In this example, the locking pin 500 is insertable and traverses the space between the first side 134 and the second side 138 of the apparatus 100 when the locking pin 500 is inserted. To move the secondary support member 104 from one position to the other, the locking pin 500 may be partially or entirely removed from the connector 402 before moving the secondary support member 104.

Additionally, the first pivot 106 is depicted in this example as having an axle 502, an eye-bolt region 504 on a first side 134 of the apparatus 100, and a thread form 506 on the second side of the apparatus 100. A nut 508 may be secured to the thread form 506 of the pivot axle 502 to secure the pivot axle 502 in place. In alternative examples, any appropriate type of mechanism may be used to lock the secondary support member in place. For example, a non-exhaustive list of components that may be incorporated into the locking mechanism may include, but is not limited to cotter pins, retaining rings, rivets, welds, crimped ends, screws, magnets, other types of pins, other types of components, or combinations thereof.

The base slot 102 is also depicted in the example of FIG. 5. In this example, a first keyhole slot 510 and a second keyhole slot 512 are defined in the back surface 128 of the base slot 102. The first and second keyhole slots 510, 512 may be used to hang the apparatus 100 from structures which fit within the keyhole slots 510, 512, such as a nail, peg, hook, etc., so that the base slot 102 is aligned with a vertical surface from which the apparatus 100 hangs. With the apparatus 100 hanging and in the expanded position, the first and second lateral support members 142, 146 may extend outwardly against the vertical surface to stabilize the apparatus from rocking with respect to the vertical surface. Further, with the secondary support member 104 extending away from the base support member 102, the secondary support member 104 also extends away from the vertical surface. In this arrangement, a tire may be secured to the vertical surface. In those examples where the tire is part of a bicycle, the bicycle may hang from the apparatus 100 on the vertical surface.

Figure 6:
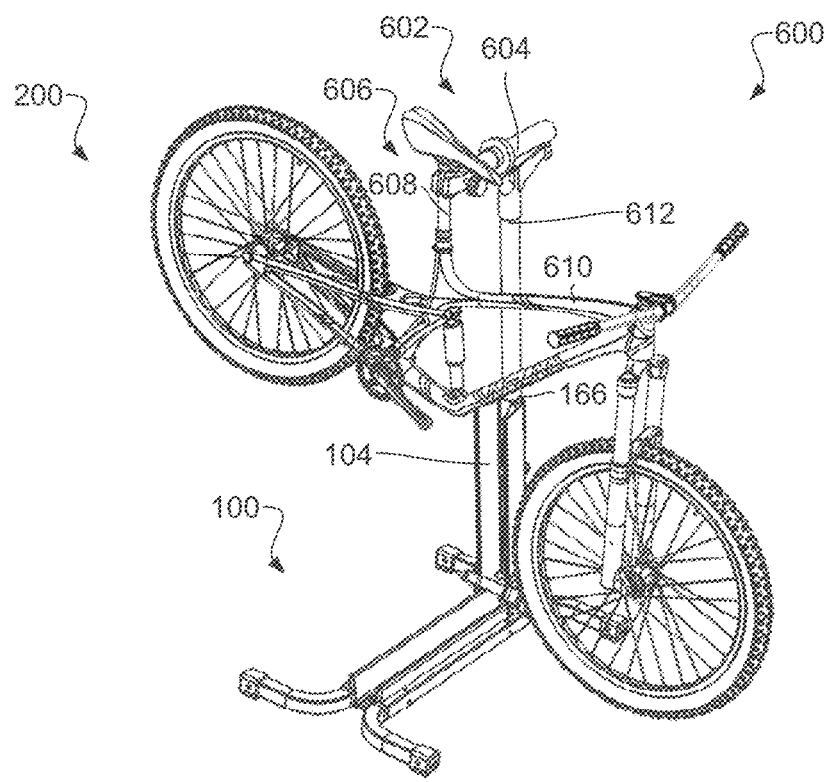
FIG. 6 is a perspective view of an example of an apparatus in an expanded position positioning a service stand to hold a bicycle in accordance with the present disclosure.
Figure 7:
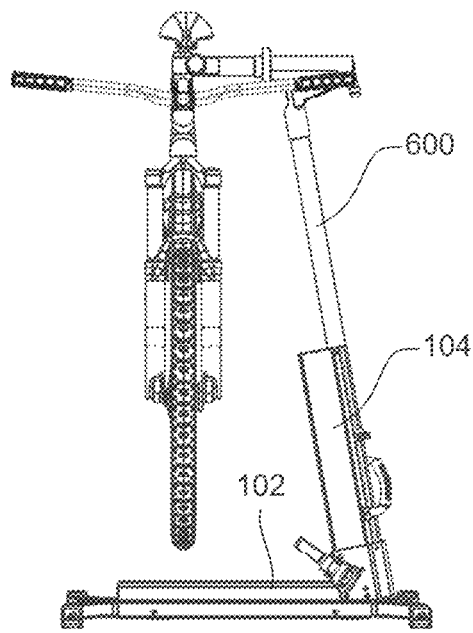
FIG. 7 is a side view of an example of an apparatus in an expanded position positioning a service stand to hold a bicycle in accordance with the present disclosure.

FIGS. 6 and 7 depict examples of a service stand 600 inserted into the service stand connector 166 incorporated into the secondary support member 104 when the apparatus 100 is in the expanded position. In this example, a bicycle 200 is supported by the service stand 600. The service stand 600 may include a rod 612 that supports an attachment assembly 602. In this example, the attachment assembly 602 includes a support beam 604 that is transversely oriented with respect to the rod. A clamp 606 is attached to the support beam 604. In the illustrated example, the clamp 606 is latched onto the bike seat support 608. However, in alternative examples, the clamp 606 may be arranged to attach to the frame 610 of the bicycle 200, another portion of the bicycle 200, or combinations thereof. In some cases, the attachment assembly 602 may include other types of attachments other than a clamp. For example, a non-exhaustive list of attachments that may be incorporated into the attachment assembly may include hooks, locks, clamps, straps, magnets, wedges, other types of attachments, or combinations thereof. Other service stands are known in the art and are suitable or adaptable for use with the apparatus of the present disclosure.

In the example of FIG. 7, the secondary support member 104 is oriented to form less than a 90 degree angle with the base support member 102. In this example, such an angle allows the bicycle 200 to hang over the base support member 102 without contacting the service stand 600 and/or the secondary support member 104.

Figure 8:
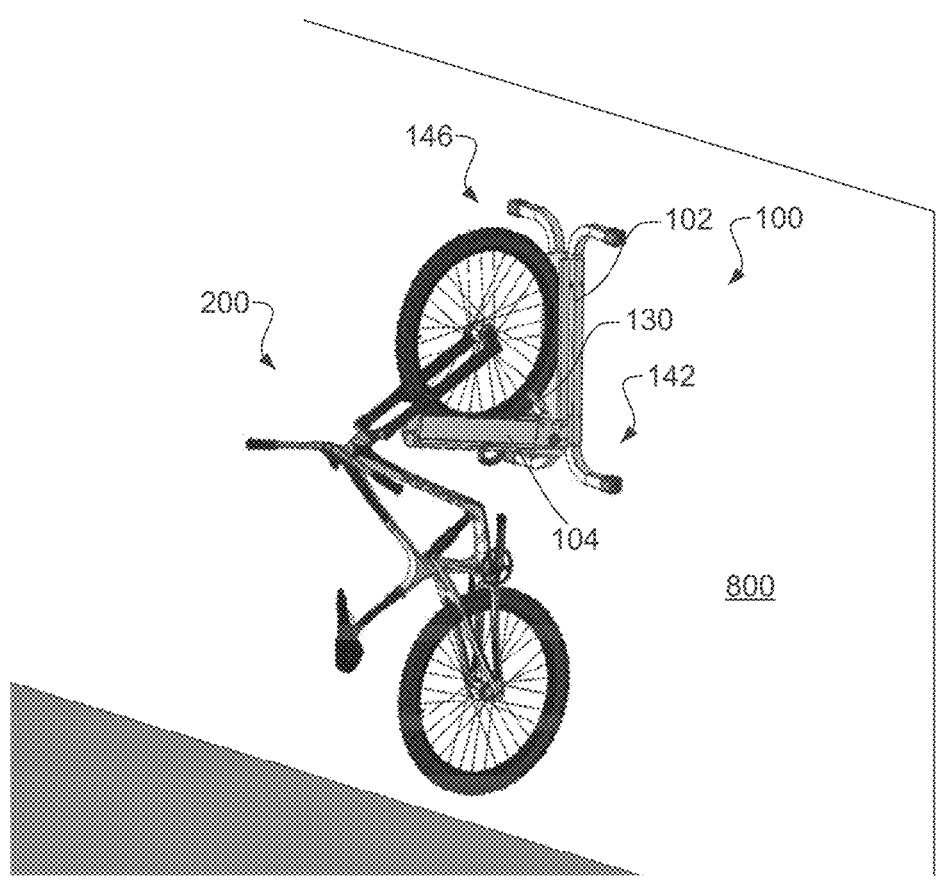
FIG. 8 is a perspective view of an example of an apparatus mounted to a wall in an expanded position holding a bicycle in accordance with the present disclosure.

FIG. 8 depicts an example of the apparatus 100 secured to a vertical surface 800, such as a wall. In this example, the apparatus 100 may be secured to vertical surface 800 through the first and second keyhole slots (510, 512, see FIG. 5) formed in the back surface of the base member. In this example, the apparatus 100 is in an expanded position, with the first and second lateral support members 142, 146 positioned to reside against or proximate the vertical surface 800 to prevent a significant amount of tilting. The secondary support member 104 may be extended to support a wheel of the bicycle 200. The fastening mechanism 130 may assist to retain the wheel within the slots of the apparatus 100. The apparatus 100 may be collapsed when not in use to conserve space.

While this example has been described with the mechanism for securing the apparatus 100 to the vertical support member being keyhole slots formed in the base support member 102, any appropriate mechanism for securing the apparatus 100 to a vertical support member may be used in accordance with the principles described in this disclosure. For example, a non-exhaustive list of securing mechanisms may include, but is not limited to, hanging the apparatus from the vertical surface 800 from one or more legs of the lateral support members, other types of slots formed in the base support member, hooks incorporated into the apparatus, screwing the apparatus to the vertical surface, magnets, other types of mechanisms, or combinations thereof.

What is claimed is:

1. An apparatus, comprising:
a base support member;
a secondary support member connected to the base support member, the secondary support member having a first side that is oriented to face the base support member;
wherein the secondary support member is configured to retain a tire; and
a single fastening mechanism attached proximate a point at which the secondary support member connects to the base support member, wherein the single fastening mechanism is sized to fasten the tire to both the base support member and the secondary support member;
a service stand connector incorporated into the apparatus; and
a service stand inserted into the service stand connector when the secondary support member is oriented into a vertical orientation in an expanded position to hold the service stand in the vertical orientation, the service stand comprising a support beam and a clamp attached to the support beam, wherein the clamp is configured to latch onto a bike, and wherein the service stand is configured to support a bicycle independently from the tire retaining mechanism such that the base support and the secondary support do not receive the tire.

2. The apparatus of claim 1, further comprising:
an elongated slot formed on the first side of the secondary support member, the elongated slot including first and second side walls and a slot depth;
wherein at least one of the first and second side walls is configured to retain a tire inserted at least partially into the elongated slot.

3. The apparatus of claim 1, further comprising:
at least one first lateral support member pivotably connected to the base support member about a pivot, wherein the pivot is transversely oriented with respect to a point at which the secondary support member connects to the base support member.

4. The apparatus of claim 3, further comprising:
at least one second lateral support member pivotably connected to the base support member about a pivot, wherein the pivot is transversely oriented with respect to a point at which the secondary support member connects to the base support member and aligned with the pivot of the first lateral support member.

5. The apparatus of claim 4, wherein the at least one second lateral support member comprises a first leg proximate a first end of the base support member and a second leg proximate a second end of the base support member.

6. The apparatus of claim 5, wherein the at least one second lateral support member is movable into an expanded position where the second lateral support member is oriented so that the first and second leg are aligned with a width of the base support member; and
wherein the at least one second lateral support member is movable into a collapsed position where the second lateral support member is oriented so that the first and second leg are transverse the width of the base support member.

7. The apparatus of claim 1, wherein the secondary support member is movable into an expanded position where the secondary support member is transversely oriented to a length of the base support member; and
wherein the secondary support member is movable into a collapsed position where the secondary support member is aligned with the length of the base support member.

8. The apparatus of claim 1, further comprising a strap connected to an end of the base support member opposite of a point at which the secondary support member connects to the base support member.

9. The apparatus of claim 1, wherein the base support member includes a base slot, the base slot including:
a first base side wall;
a second base side wall facing the first side wall;
wherein at least one of the first base side wall and the second base side wall is tapered with respect to the other and configured to retain at least a portion of a tire in the base slot.

10. The apparatus of claim 1, further comprising:
a rotation limiting mechanism incorporated into a pivot connection between the base support member and the secondary support member limiting a freedom of rotation between the base support member and the secondary support member to under 100 degrees.

11. The apparatus of claim 1, further comprising:
a wall suspension mechanism that connects at least a portion of the apparatus to a vertical surface so that the base support member is oriented against the vertical surface and the secondary support mechanism is transversely oriented with respect to the vertical surface when the secondary support mechanism is in an expanded position.

12. A balance apparatus, comprising:
a base support member;
a secondary support member connected to the base support member,
a first side of the secondary support member that is oriented to face the base support member;

a tire retaining mechanism incorporated into the first side, the tire retaining mechanism including a receptacle configured to retain a tire inserted at least partially into the receptacle;

a service stand connector incorporated into the apparatus; and a service stand inserted into the service stand connector when the secondary support member is oriented into a vertical orientation in an expanded position to hold the service stand in the vertical orientation, the service stand comprising a support beam and a clamp attached to the support beam, wherein the clamp is configured to latch onto a bike, and wherein the service stand is configured to support a bicycle independently from the tire retaining mechanism such that the receptacle does not receive the tire.

13. The apparatus of claim 12, further comprising:

a first lateral support member pivotably connected to a first side of the base support member about a first pivot connection;

a second lateral support member pivotably connected to a second side of the base support member about a second pivot connection;

wherein the pivots are transversely oriented with respect to a point at which the secondary support member connects to the base support member.

14. The apparatus of claim 13, wherein at least one of the first lateral support member and the second lateral support member comprises a first leg and a second leg extending away from the pivots.

15. The apparatus of claim 14, wherein the apparatus is movable into an expanded position where the first lateral support member and the second lateral support member are oriented so that the first leg and the second leg are aligned with a width of the base support member; and wherein the secondary support member is transversely oriented with respect to a length of the base support member in the expanded position.

16. The apparatus of claim 14, wherein the apparatus is movable into a collapsed position where the first lateral support member and the second lateral support member are oriented so that the first and second legs transversely oriented with respect to a width of the base support member; and wherein the secondary support member is aligned with respect to a length of the base support member in the collapsed position.

17. The apparatus of claim 13, further comprising an anti-over rotation linkage connected to an end of the base support member opposite of the first pivot connection between the base support member and the secondary support member.

18. The apparatus of claim 12, wherein the base support member includes a base slot, the base slot including:

a first base side wall;

a second base side wall facing the first side wall;

wherein at least one of the first base side wall and the second base side wall is angled with respect to the other and configured to retain at least a portion of the tire in the base slot.

* * * * *